(No Model.)

M. M. REIS.
TAG.

No. 244,667.　　　　　　　　　Patented July 19, 1881.

WITNESSES:
James F. Tobin,
Wm. P. Logan

INVENTOR
M. M. Reis
by his Attorneys
Howson and Sons

UNITED STATES PATENT OFFICE.

MORRIS M. REIS, OF PHILADELPHIA, PENNSYLVANIA.

TAG.

SPECIFICATION forming part of Letters Patent No. 244,667, dated July 19, 1881.

Application filed May 12, 1881. (No model.)

*To all whom it may concern:*

Be it known that I, MORRIS M. REIS, a citizen of the United States, residing in Philadelphia, Pennsylvania, have invented an Improvement in Price-Tags, of which the following is a specification.

My invention relates to an improvement in that class of tags which are furnished with pins or hooks, whereby they are attached to the articles in connection with which they are intended to be used, the main object of my improvement being to so construct such a tag that it can be readily applied or removed, but will be firmly retained when in place, a further object being to protect the point of the pin with which the tag is furnished. These objects I attain in the manner which I will now proceed to describe, reference being had to the accompanying drawings, in which—

Figure 1:
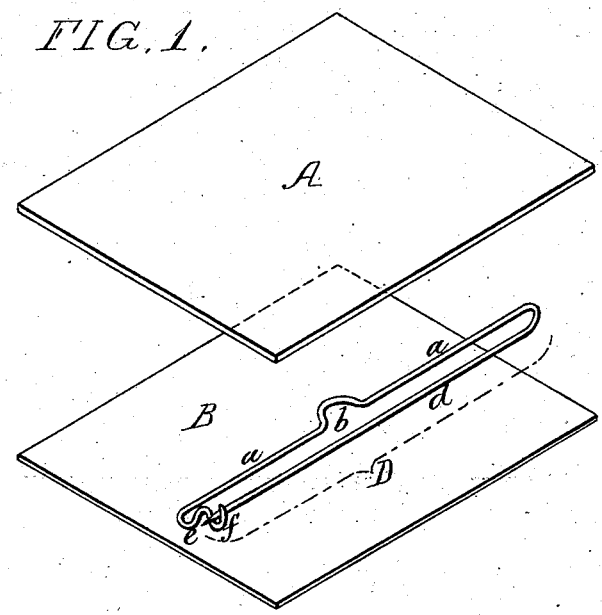
Figure 2:
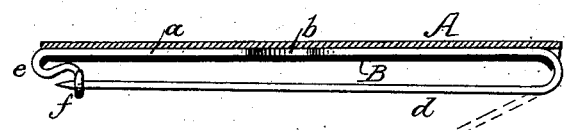
Figure 3:

Figure 1 is a perspective view, drawn to an enlarged scale, and showing the parts of my improved tag detached from each other; Fig. 2, a longitudinal section of the tag, also drawn to an enlarged scale; and Fig. 3, a transverse section.

The tag consists of two cards, A and B, which are secured together by any suitable paste or cement, and between which is secured the shank $a$ of the pin D, said shank having a loop, $b$, formed thereon to give it a lateral bearing on the card and prevent the twisting of the shank; or, in place of the loop, the shank may be flattened throughout the whole or a part of its length. One of the free ends of the shank is bent, so as to form the stem $d$, which is pointed at the end, the opposite free end of the shank being bent first rearward beneath the edge of the card, as shown at $e$, and being then bent laterally, so as to form the hook $f$, which receives and retains the end of the stem $d$ of the pin, the elasticity of the latter being such that when the end of the stem is released from the hook $f$ said stem will assume the position shown by dotted lines in Fig. 2, so that it can readily be applied to a piece of cloth or other article to which the tag is to be secured. The eye $f$ effectually retains the end of the stem $d$ after the tag is attached, the bent portion $e$ of the shank $a$ projecting beyond the point of the stem $d$ and preventing the latter from catching in goods with which it is brought in contact or from injuring persons who may be handling the goods.

I claim as my invention—

The combination of the two parts A B of the tag with the pin D, having a shank, $a$, secured between said parts, one end of the shank being bent to form a lateral hook, $f$, for the reception of the pointed stem $d$ of the pin, said hook $f$ occupying a position so far from the edge of the tag that the point of the stem $d$ does not extend beyond the latter, as set forth.

In testimony whereof I have signed my name to this specification in the presence of two subscribing witnesses.

MORRIS M. REIS.

Witnesses:
 WM. P. LOGAN,
 HARRY SMITH.